US008244663B2

(12) United States Patent
Altay et al.

(10) Patent No.: US 8,244,663 B2
(45) Date of Patent: Aug. 14, 2012

(54) METHOD AND HOST DEVICE FOR ENFORCING A RULE ASSOCIATED WITH A MEDIA FILE

(75) Inventors: Ahmet Altay, Mountain View, CA (US); Po Yuan, Milpitas, CA (US); Junzhi Wang, San Jose, CA (US); Haluk Kent Tanik, Mountain View, CA (US)

(73) Assignee: SanDisk Technologies Inc., Plano, TX (US)

( * ) Notice: Subject to any disclaimer, the term of this patent is extended or adjusted under 35 U.S.C. 154(b) by 624 days.

(21) Appl. No.: 12/472,929

(22) Filed: May 27, 2009

(65) Prior Publication Data

US 2010/0306152 A1 Dec. 2, 2010

(51) Int. Cl.
*G06F 17/00* (2006.01)
*G06N 5/02* (2006.01)

(52) U.S. Cl. .......................................... 706/47
(58) Field of Classification Search ...................... 706/47
See application file for complete search history.

(56) References Cited

U.S. PATENT DOCUMENTS

| 2005/0172122 A1 | 8/2005 | Risan et al. |
| 2006/0062426 A1 | 3/2006 | Levy et al. |
| 2007/0206247 A1 | 9/2007 | Kaplan |
| 2007/0244986 A1 | 10/2007 | Svendsen |
| 2008/0114772 A1 | 5/2008 | Jogand-Coulomb et al. |
| 2008/0159715 A1 | 7/2008 | Fuasaro et al. |
| 2009/0006796 A1 | 1/2009 | Chang et al. |
| 2009/0164779 A1 | 6/2009 | Yan et al. |

FOREIGN PATENT DOCUMENTS

| WO | WO 01/93200 | 12/2001 |
| WO | WO 03/065219 | 8/2003 |
| WO | WO 03/065219 A1 * | 8/2003 |
| WO | WO 2009/145750 | 12/2009 |

OTHER PUBLICATIONS

International Search Report and Written Opinion for PCT/US2010/034356, dated Dec. 15, 2010, 21 pages.
"Getting the Sound Length in Progress Bar", http://social.msdn.microsoft.com/Forums/en-US/Vsexpressvcs/thread/56b4f289-8bb1-438b-ab04-3f977d76b548, Dec. 3, 2006, 6 pages.
"Windows Media Player Object Model Version 6.4 Properties", http://msdn.microsoft.com/library/default.asp?url=/library/en-us/wmp6sdk/htm/windowsmediaplayercontrolmethods.asp, 1999, 4 pages.
International Search Report and Written Opinion for PCT/US2010/034356, dated Aug. 24, 2010, 7 pages.

* cited by examiner

*Primary Examiner* — Michael B Holmes
(74) *Attorney, Agent, or Firm* — Brinks Hofer Gilson & Lione

(57) ABSTRACT

The embodiments described herein generally relate to a method and host device for enforcing a rule associated with a media file. In one embodiment, an observer module determines that a media player is attempting to play a media file. Before allowing the media player to play the media file, the observer module determines if the media file is associated with a rule that specifies an action to be taken if a playback event is detected. If it is determined that the media file is associated with a rule, the observer module observes playback of the media file to detect if the playback event specified in the rule occurred and takes the action specified in the rule if the playback event is detected.

39 Claims, 3 Drawing Sheets

METHOD AND HOST DEVICE FOR ENFORCING A RULE ASSOCIATED WITH A MEDIA FILE

BACKGROUND

Some media files are associated with a rule that specifies an action to be taken if a playback event occurs. For example, the media file can contain preview or promotional content of a full-length media file (e.g., a trailer of a movie or a short clip of a music single), and the rule can specify that, at the end of the playback of the promotional content, a connection is to be made to a web site to allow a user to purchase the full-length media file. A problem occurs, however, when such "preview-connect" media files are played by a media player that is not aware of the rule either because the media player is not aware of rules in general or because the media player is aware of some types of rules but not the type of rule being used with a given media file. In such situations, the media player either rejects playing the media file (e.g., because it does not understand the header of the file, which can contain the rule) or plays the media file but ignores the rule (and, therefore, does not perform the action specified in the rule). Both outcomes are undesirable because either the promotional content is not played at all and therefore does not promote the full-length media file, or the promotional content is played but does not trigger a mechanism to allow the user to purchase the full-length media file.

SUMMARY

Embodiments of the present invention are defined by the claims, and nothing in this section should be taken as a limitation on those claims.

By way of introduction, the embodiments described below generally relate to a method and host device for enforcing a rule associated with a media file. In one embodiment, an observer module determines that a media player is attempting to play a media file. Before allowing the media player to play the media file, the observer module determines if the media file is associated with a rule that specifies an action to be taken if a playback event is detected. If it is determined that the media file is associated with the rule, the observer module observes playback of the media file to detect if the playback event specified in the rule occurred and takes the action specified in the rule if the playback event is detected.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

By way of introduction, the following embodiments provide a method and host device for enforcing a rule associated with a media file. As discussed above, a problem can occur if a media player is not aware of a rule associated with a media file. These embodiments address this problem by using an observer module in a host device to observe playback of the media file. If the observer module detects that the playback event specified in the rule occurred, it takes the action specified in the rule. This allows the rule to be enforced even when the media player is not aware of the rule. In contrast, prior methods and host devices would deal with such situations by either rejecting playing the media file altogether or playing the media file but ignoring the rule.

Figure 1:
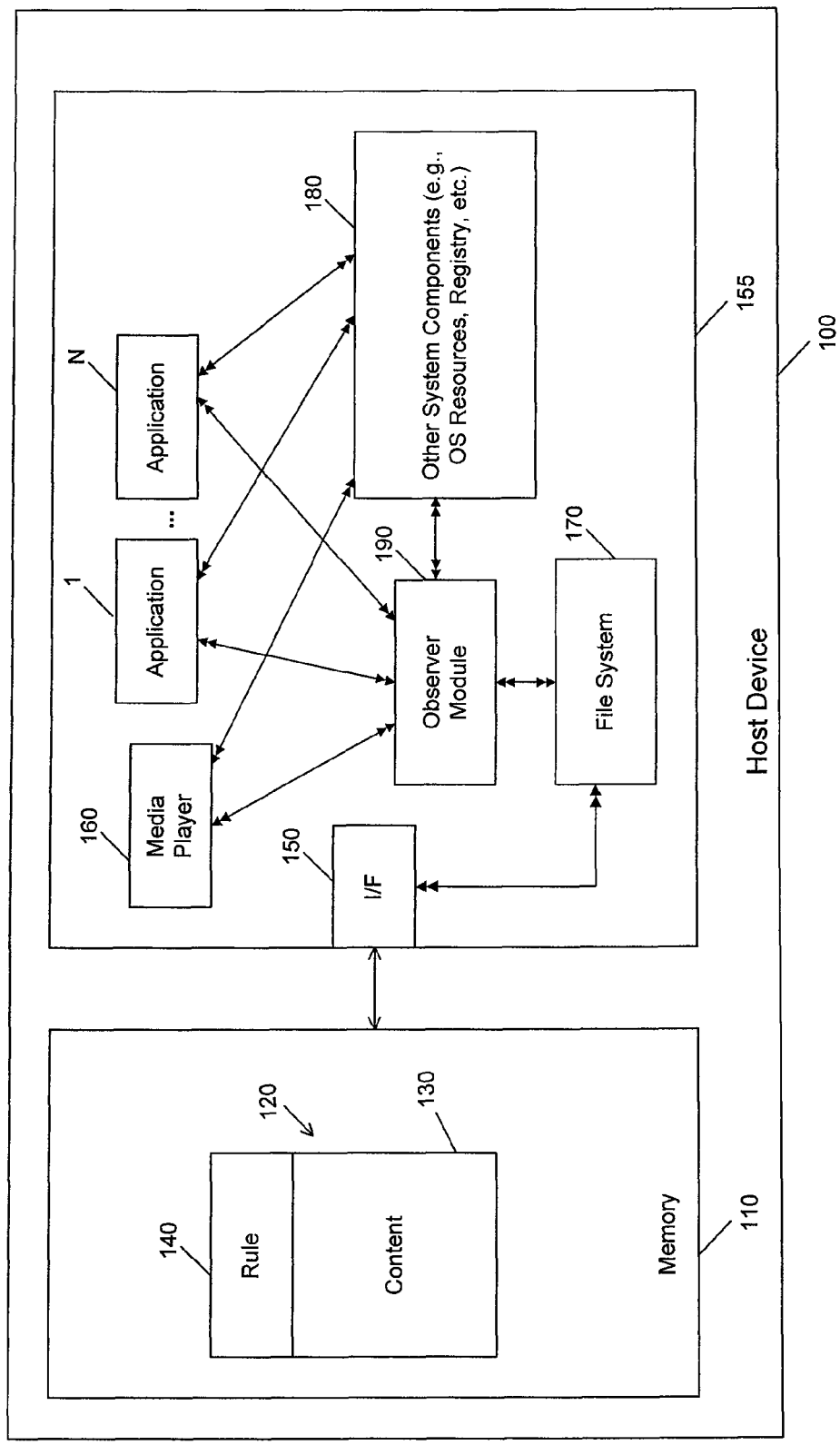
FIG. 1 is a block diagram of a host device of an embodiment.

Turning now to the drawings, FIG. 1 is a block diagram of a host device 100 of an embodiment. The host device 100 can take any suitable form, including, but not limited to, a mobile phone, a personal computer, an audio and/or video player, a game console, a digital camera, a document (e.g., a digital book) viewer, a set-top box, a display device (e.g., a television), a personal digital assistant (PDA), a car stereo, and a navigation system. The host device 100 comprises a memory 110, which can take any suitable form. In one embodiment, the memory 110 takes the form of a solid-state (e.g., flash) memory and can be one-time programmable, few-time programmable, or many-time programmable. However, other forms of memory, such as optical memory and magnetic memory, can be used. While the memory 110 can be built-in to the host device 100, in one embodiment, the memory 100 takes the form of a removable mass storage device, such as a memory card or universal serial bus (USB) device. One advantage of using a removable mass storage device is that a user can use the memory 110 with a variety of hosts. Without intending to be a restriction on the claims, in one presently preferred embodiment, the memory 110 takes the form of a TrustedFlash™ memory card by SanDisk Corporation.

As shown in FIG. 1, the memory 110 stores a media file 120 that contains digital content in the body 130 of the media file 120. "Content" can take any suitable form, such as, but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game, a map, a data file, a software application, and a hybrid of two or more of these items. Content can be stored in the memory 110 in any suitable way, such as preloaded into the memory 110 prior to possession of the memory 110 by the end user, downloaded to the memory 110 from a content provider's server, or sideloaded from another device. In one embodiment, content takes the form of preview or promotional content of a full-length media file (e.g., a trailer of a movie or a short clip of a music single). Although only one media file 120 in shown stored in the memory 110 in FIG. 1, the memory 110 can store additional files.

The media file 120 is associated with a rule that specifies an action to be taken if a playback event occurs. In this embodiment, the rule is stored in the header 140 of the media file 120 as part of its metadata; however, in other embodiments, the rule can be stored in another portion of the media file 120 (e.g., in the body 130 of the media file 120), in a separate file, in a database, or in any other suitable location. A "playback event" can be any predefined event associated with the playback process. For example, a playback event can occur before playback of the media file 120 begins, after a specified number of playbacks, at a specified time during playback, at an end of playback, and/or when playback rights to the media file 120 expire. A "rule" can specify one or more predefined actions to be taken if a playback event is detected. For example, the action specified in the rule can be to connect to a network location associated with the media file 120 (e.g., navigate to a web site), execute an application with some parameters, display a message (e.g., asking the user if he wants to be taken to a web site) and/or do another action based on user input. Also, a rule can specify a number of actions instead of a single action, and one or more of those actions can be selected based on, for example, information about the host 100 (e.g., operating system parameters, screen size, type of processor, etc.), information associated with the content, time/date information, identification of the user, and identification of a mobile network operator ("MNO").

Figure 2:
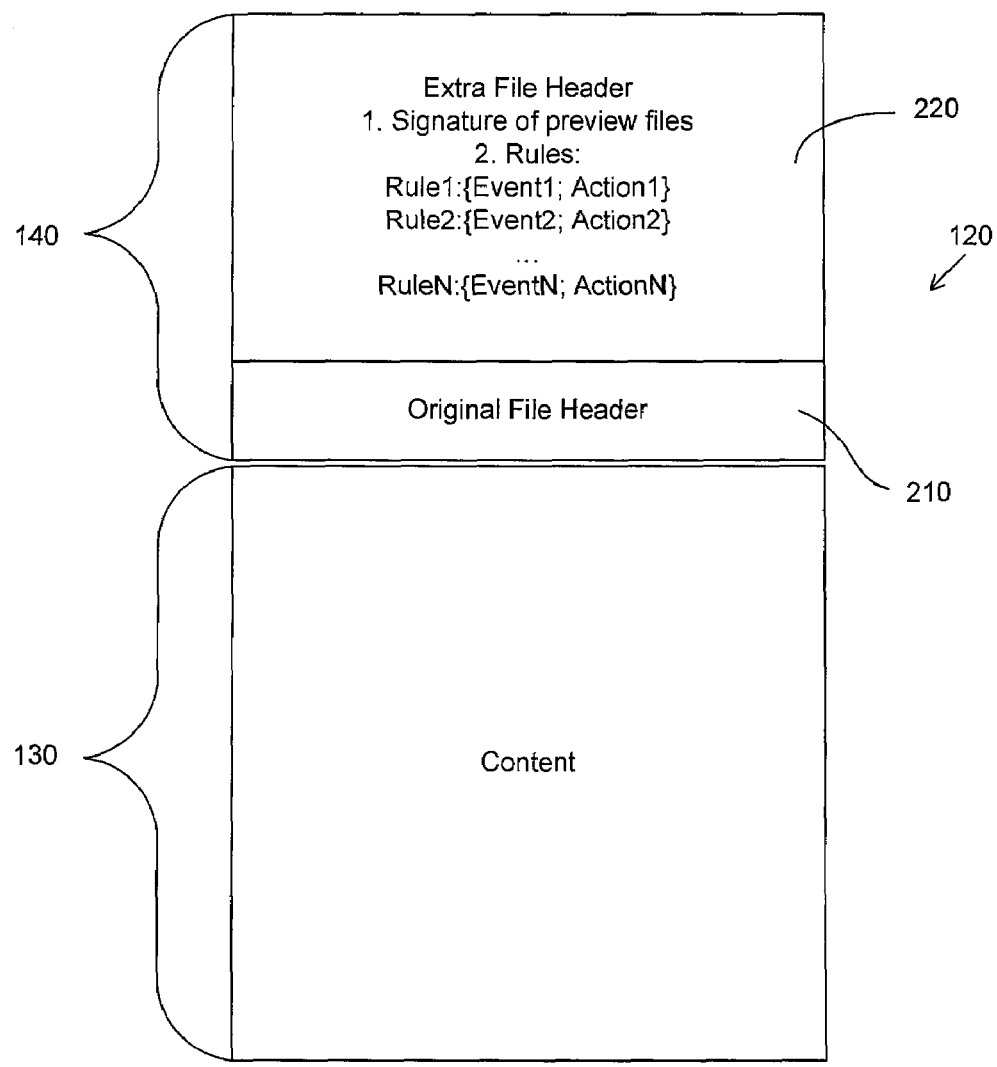
FIG. 2 is an illustration of a media file format of an embodiment.

FIG. 2 illustrates an exemplary format for the media file 120. It should be noted that this format is merely an example, and other formats can be used. As discussed above, in this embodiment the media file 120 comprises a body 130 and a header 140. The body 130 contains content that most media players can play (e.g., an mp3 file or a wmv file). The header 140 of the media file 120 contains an original file header portion 210 that is also understandable by most media players and contains information such as the file size and playback rate (e.g., bits per second). However, in this embodiment, the header 140 also contains an extra file header portion 220 that contains a signature that specifies that the media file 120 is associated with a rule (e.g., that it is a "preview file") and also contains the rules. This extra file header portion 220 is preferably encoded inside metadata so that it will not interfere with the normal operation of a media player. Also, when the media file 120 is copied or moved, the extra file header portion 220 is preferably also copied or moved with the media file 120.

As mentioned above, the playback event and action specified in the rule can take any suitable form. The following are examples of various playback event/action pairs. These examples are intended merely to illustrate various rules that can be used and are not intended to be a limitation on the claims. In one example, the content in the media file 120 is preview or promotional content of a full-length media file (e.g., a trailer of a movie or a short clip of a music single), and the rule can specify that, when the user comes to the end of the promotional content, a connection is to be made to a web site to allow a user to purchase the full-length media file. In this way, after the user previews a movie trailer, for example, the user is presented with a purchasing web site, through which he can buy and watch the full-length movie (and potentially download the full-length movie or download a key to unlock the full-length movie, if stored in a hidden portion of memory). As another example, the content can be full-length content that is protected by a digital rights management ("DRM") system that denies further access to the content after a certain amount of time or a certain number of plays. The rule associated with the media file 120 can specify that after access to the content expires (e.g., at the end of the $n^{th}$ playback), a browser in the host device 100 should connect to a resource at a particular network location (e.g., a website at a specific uniform resource locator ("URL")) to give the user the opportunity to purchase access rights to the content. In the above examples, the playback event that triggered the action occurred at the end of playback or at the end of the rights period; however, a playback event can occur sooner (e.g., during the middle of playback). Also, instead of the action being directed to a user purchasing a full-length version of the content or purchasing additional access rights to the content, the action can be for a different service (e.g., purchasing tickets to see an artist in concert).

Returning to FIG. 1, the host device 100 contains a memory interface 150 to place the memory 110 in communication with other components 155 in the host device 100. As used herein, the phrase "in communication with" means directly in communication with or indirectly in communication with through one or more components, which may or may not be shown or described herein. While several of these other components 155 are shown in FIG. 1, additional components that can be part of the host device 100 (e.g., a display device, speaker, power supply, etc.) are not shown in FIG. 1 to simplify the drawing. Also, while these other components 155 can take any suitable form, in one embodiment, these other components 155 are implemented in software, which is stored in memory 110 or in a different memory and executed by a controller or central processing unit in the host device 100. Alternatively, one or more of these items can be implemented in hardware only.

As shown in FIG. 1, the host device 100 contains a media player 160, which is operative to play the digital content of the media file 120. The media player 160 can take any suitable form and, depending on the content to be played, can be an audio and/or video player. Although any suitable media player can be used, in one embodiment, the media player 160 takes the form of a mobile media player, such as a Symbian player, a Windows Mobile Media Player, and a Real Player for mobile devices, when the host device 100 is a mobile phone or other type of mobile device. The host device 100 also has one or more other applications 1-N, such as a web browser, audio/video recorder, telephony application, calendar application, etc. The host device 100 also contains a file system 170, which translates requests for file operations from the media player 160 and the other applications 1-N into lower-level tasks that can be understood by the memory interface 150 for communication with the memory 110. The host device 100 can also contain other system components 180, such as operating system resources and a registry. Although any suitable operating system can be used, in one embodiment, the operating system takes the form of a mobile operating system, such as Windows Mobile, when the host device 100 is a mobile phone or other type of mobile device.

As discussed in the background section above, not all media players that are native (i.e., built-in) to an operating system of a host device are aware of rules associated with media files either because the media player is not aware of rules in general or because the media player is aware of some types of rules but not the type of rule being used with a given media file. In such situations, the media player either rejects playing the media file altogether (e.g., because it does not understand the header of the file, which can contain the rule) or plays the media file but ignores the rule (and, therefore, does not perform the action specified in the rule). To address this problem, the host device 100 of this embodiment contains an observer module 190 that works in the background as a service and observes the media player 160 (and, optionally, the other applications 1-N) for their operation. More specifically, the observer module 190 is a background service agent that functions as a file system filter to observe all file system operations before they reach the file system 170. In this way, if the media player 160 starts playing the media file 120, the observer module 190 ensures that the rule associated with the media file 120 is enforced. The observer module 190 can be built-in to the host device 100 during manufacturing, can be downloaded to the host device 100 from a server, or can be provided to the host device 100 via a removable memory device (e.g., via a memory card that also stores the media file 120). Additionally, instead of being inside the host device 100, the observer module 190 can be outside of the host device 100 (e.g., running in a server or other device (e.g., another computing device, a memory card, etc.) in communication with the host device 100).

Before turning to the specific operation of the observer module 190, it should be noted that the observer module 190 can be implemented exclusively in hardware (e.g., using logic gates, switches, and/or an application specific integrated circuit (ASIC)), exclusively in software (e.g., as computer-readable program code executed by a processor), or with a combination of hardware and software. In one embodiment, the software/firmware to implement the observer module 190 is stored in ROM or a non-volatile memory device (e.g., memory 100) of the host device 100 and executed by a processor in the host device 100, where such processor can be used exclusively to implement the observer module 190 or can be used to perform other functions in the host device 100. Suitable types of processors include, but are not limited to, a Samsung S5L8900 processor, a Marvell PXA270 processor, a Marvell PXA310 processor, a Qualcomm MSM7201A processor, and a Qualcomm MSM7225 processor. In one embodiment, the software/firmware routine executed by the processor to implement the observer module 190 performs the acts shown in FIG. 3 and described below.

Figure 3:
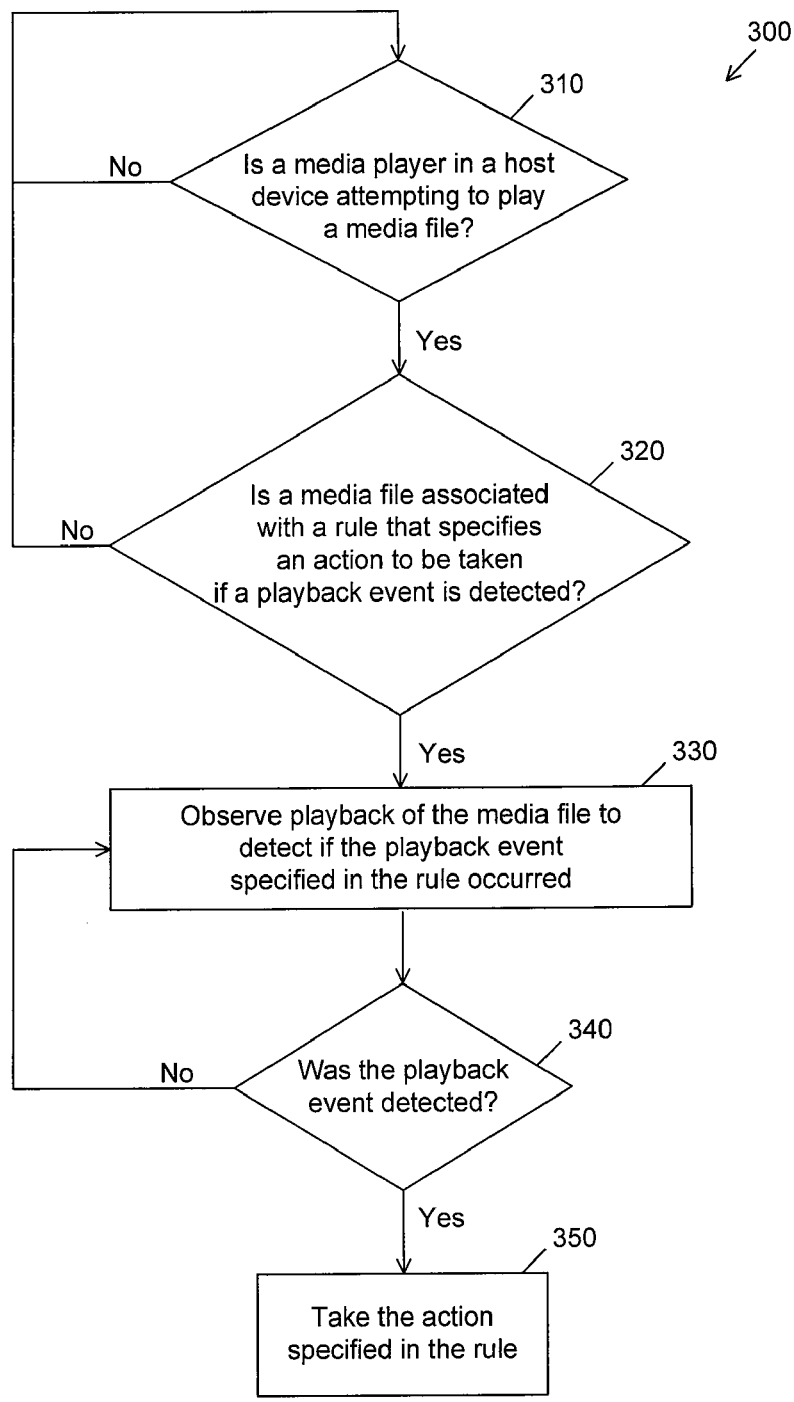
FIG. 3 is a flow chart of a method of an embodiment for enforcing a rule associated with a media file.

Returning to the drawings FIG. 3 is a flow chart 300 of a method of an embodiment performed by the observer module 190 to enforce a rule associated with the media file 120 when the media player 160 is not aware of the rule. As shown in FIG. 3, the observer module 190 first determines if the media player 160 in the host device 100 is attempting to play the media file 120 (act 310). Since the observer module 190 acts as a file system filter, the observer module 190 has knowledge of file operations occurring in the host device 100 before they actually reach the file system 170. Accordingly, the observer module 190 can monitor requests to open the media file 120 made from any of the entities in the host device 100. The observer module 190 can then compare identification information (e.g., a process identifier and/or an application name) associated with the entity sending the request with identification information of known media players. If the identification information is of a known media player, the observer module 190 would know that a media player is attempting to play the media file. Alternatively, the observer module 190 can compare a file-based operation pattern being performed by the entity sending the request with a file-based operation pattern of known media players. For example, when a Windows Mobile Media Player attempts to play a file, the Media Player performs the following acts: Open file, Read header, Seek metadata location, Read metadata, Close file, Open file again, Read data, . . . , Read data, Close file again. So, in this example, the signature file-based operation pattern can be a file read pattern (e.g., read data in small amounts (e.g., 64 kb blocks), a file seek pattern (e.g., read certain locations for metadata, title, and duration), or a file open/close pattern (e.g., open file two times).

Returning to FIG. 3, if the observer module 190 does not determine that the media player 160 is attempting to play the media file 120, the observer module 190 will continue monitoring. However, if the observer module 190 does determine that the media player 160 is attempting to play the media file 120, before allowing the media player 160 to play the media file 120, the observer module 190 determines if the media file 120 is associated with a rule that specifies an action to be taken if a playback event is detected (act 320). This determination can be made in any suitable way. For example, if the media player 160 is attempting to open a file in the memory 110, the observer module 190 can open the file first to check the file header of the file to see if it is associated with a rule (e.g., if the header contains the rule or a reference to the rule).

If the observer module 190 determines that the media file 120 is not associated with a rule, the observer module 190 returns to monitoring the media player 160 to determine if an attempt is made to play another media file (act 310). However, if the observer module 190 determines that the media file 120 is associated with a rule, the observer module 190 observes playback of the media file 120 to detect if the playback event specified in the rule occurred (acts 330 and 340). The observer module 190 can perform these functions in any suitable way. For example, if the playback event occurs at a specified time during playback or at an end of playback, the observer module 190 can detect such playback event by observing messages transmitted by the media player 160 that specify a current time in playback. (When the media player 160 takes the form of Windows Media Player, the media player 160 would broadcast messages including the current time in playback and duration of the file through the system registry 180.) As another example, if the playback event is the end of playback, the observer module 190 can detect this playback event by reading playback rate and duration information of the media file 120 from the header 140 (or from messages transmitted by the media player 160). Specifically, the observer module 190 can calculate an amount of data of the media file 120 that was played by the media player 160, calculate a playback time of the media file 120 from the playback rate and the calculated amount of the data, and compare the calculated playback time with the duration information. Alternatively, the observer module 190 can detect the end of playback by detecting that all bytes of the media file 120 were read by the media player 160. As yet another example, if the playback event is a specified number of playbacks, the observer module 190 can detect this playback event by reading the playback count field in the header 140 of the media file 120, which contains the number of playbacks. The observer module 190 can also update the playback count field after the media player 160 plays the media file 120.

If the observer module 190 does not detect the occurrence of the playback event, the observer module 190 continues to observe the playback (act 330). However, if the observer module 190 detects the occurrence of the playback event, the observer module 190 takes the action specified in the rule (act 350). As mentioned above, the action can take any suitable form, such as, but not limited to, connecting to a network location associated with the media file 120 (e.g., navigate to a web site), executing an application, and/or displaying a message. Depending on the type of action, the observer module 190 can communicate with one or more of the other applications 1-N on the host device 100. For example, if the media file 120 is a preview file that contains a trailer of a movie, at the conclusion of the trailer (i.e., at the playback event), the observer module 190 can send the URL specified in the header 140 of the media file 120 to a web browser in the host device 100 to automatically display a web page that allows the user to purchase the full-version of the movie. As another example, the rule may specify that, at some point during playback, an advertisement should be played. In this situation, the observer module 190 can monitor playback for the specified point in time and the open an application that will play the advertisement.

There are several advantages associated with these embodiments. First, these embodiments address the problem encountered in prior host devices that use a media player is not aware of a rule associated with a media file. Specifically, using the observer module of these embodiments allows a rule to be enforced even when the native media player of the host device is not aware of the rule. These embodiments also provide advantages over possible other solutions to the problem discussed in the background section above. For example, one alternate solution to the problem discussed above is to develop a custom media player for the host device to ensure that the rule associated with the media file will be understood and followed. However, developing and maintaining a custom media player for a variety of host devices is not a cost-effective solution. Also, a custom media player may not be as desirable as the native (i.e., built-in) media player of a host device. Native media players tend to support more codecs and file formats than custom media players and also tend to be stable because they are rigorously tested on specific platforms. Additionally, native media players tend to be better integrated and have the same theme and color scheme with other native applications on a host device. Another alternate solution to the problem discussed above is to develop a plug-in for a native media player to allow that player to understand and follow the rule. However, while some media players support plug-ins, most mobile media players do not provide this capability. Therefore, the use of plug-ins would not solve the problem for mobile host devices, such as mobile phones.

There are many alternatives that can be used with these embodiments. For example, some media players may not be able to play the media file 120 if the rule is contained in the extra file header portion 220 (see FIG. 2). To address this problem, when the media player 160 sends a command to read the media file 120 to the file system 170, the observer module 190 could intercept the command and open the media file 120 first. The observer module 190 can then read the extra file header portion 220 and let the media player 160 start reading the media file 120 from the original file header portion 210. The observer module 190 can perform the same task of presenting the media file 120 without the extra file header portion 220 for the other applications 1-N, if those other applications 1-N also have trouble reading the extra file header portion 220.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for enforcing a rule associated with a media file when the media file is played by a media player that is not aware of the rule, the method comprising:
   using an observer module to perform the following:
   determining that a media player is attempting to play a media file;
   before allowing the media player to play the media file, determining if the media file is associated with a rule that specifies an action to be taken if a playback event is detected; and
   if it is determined that the media file is associated with the rule:
   observing playback of the media file to detect if the playback event specified in the rule occurred; and
   taking the action specified in the rule if the playback event is detected.

2. The method of claim 1, wherein the observer module determines that a media player is attempting to play the media file by:
   determining that an attempt is being made to open the media file by an entity; and
   comparing identification information associated with the entity with identification information of media players known to the observer module.

3. The method of claim 2, wherein the identification information is one or both of the following: a process identifier and an application name.

4. The method of claim 1, wherein the observer module determines that a media player is attempting to play the media file by:
   determining that an attempt is being made to open the media file by an entity; and
   comparing a file-based operation pattern being performed by the entity with a file-based operation pattern of media players known to the observer module.

5. The method of claim 4, wherein the file-based operation pattern is one or more of the following: a file read pattern, a file seek pattern, and a file open/close pattern.

6. The method of claim 1, wherein the observer module determines that the media file is associated with the rule by determining that a header of the media file contains the rule.

7. The method of claim 1, wherein the observer module observes the playback of the media file to detect if the playback event specified in the rule occurred by observing messages transmitted by the media player during playback.

8. The method of claim 7, wherein the messages specify a current time in playback and a duration of the media file.

9. The method of claim 1, wherein the playback event occurs at one or more of the following: before playback starts, after a specified number of playbacks, at a specified time during playback, at an end of playback, and after playback rights expire.

10. The method of claim 1, wherein the playback event occurs after a specified number of playbacks, and wherein the method further comprises updating a playback count field in a file header of the media file after the media player plays the media file.

11. The method of claim 1, wherein the playback event is an end of playback of the media file, and wherein the observer module detects if the end of playback occurred by:
   reading playback rate and duration information of the media file from a header of the media file;
   calculating an amount of data of the media file that was played by the media player;
   calculating a playback time of the media file from the playback rate and the amount of the data of the media file that was played by the media player; and
   comparing the calculated playback time with the duration information.

12. The method of claim 1, wherein the playback event is an end of playback of the media file, and wherein the observer module detects the end of playback occurred by detecting that all bytes of the media file were read by the media player.

13. The method of claim 1, wherein the rule is part of a header of the media file, which header is unrecognizable to the media player, and wherein the method further comprises presenting the media file to the media player without the header.

14. The method of claim 13, wherein the header is unrecognizable to at least one additional application module, and wherein the method further comprises presenting the media file to the at least one additional application module without the header.

15. The method of claim 1, wherein the action specified in the rule is one or more of the following: connecting to a network location associated with the media file, executing an application, and displaying a message.

16. The method of claim 1, wherein the observer module comprises a file system filter that has knowledge of file operations.

17. The method of claim 1, wherein the media file is stored in a removable mass storage device.

18. The method of claim 17, wherein the removable mass storage device comprises a memory card.

19. The method of claim 1, wherein the observer module and the media player are in a host device.

20. The method of claim 19, wherein the host device is a mobile device, and wherein the media player is a mobile media player.

21. A host device comprising:
a media player that is not aware of a rule that is associated with a media file and specifies an action to be taken if a playback event is detected; and
an observer module configured to:
  determine that the media player is attempting to play the media file;
  before allowing the media player to play the media file, determine if the media file is associated with the rule; and
  if it is determined that the media file is associated with the rule:
    observe playback of the media file to detect if the playback event specified in the rule occurred; and
    take the action specified in the rule if the playback event is detected.

22. The host device of claim 21, wherein the observer module is configured to determine that a media player is attempting to play the media file by:
  determining that an attempt is being made to open the media file by an entity in the host device; and
  comparing identification information associated with the entity with identification information of media players known to the observer module.

23. The host device of claim 22, wherein the identification information is one or both of the following: a process identifier and an application name.

24. The host device of claim 21, wherein the observer module is configured to determine that a media player is attempting to play the media file by:
  determining that an attempt is being made to open the media file by an entity in the host device; and
  comparing a file-based operation pattern being performed by the entity with a file-based operation pattern of media players known to the observer module.

25. The host device of claim 24, wherein the file-based operation pattern is one or more of the following: a file read pattern, a file seek pattern, and a file open/close pattern.

26. The host device of claim 21, wherein the observer module is configured to determine that the media file is associated with the rule by determining that a header of the media file contains the rule.

27. The host device of claim 21, wherein the observer module is configured to observe the playback of the media file to detect if the playback event specified in the rule occurred by observing messages transmitted by the media player during playback.

28. The host device of claim 27, wherein the messages specify a current time in playback and a duration of the media file.

29. The host device of claim 21, wherein the playback event occurs at one or more of the following: before playback starts, after a specified number of playbacks, at a specified time during playback, at an end of playback, and after playback rights expire.

30. The host device of claim 21, wherein the playback event occurs after a specified number of playbacks, and wherein the observer module is further configured to update a playback count field in a file header of the media file after the media player plays the media file.

31. The host device of claim 21, wherein the playback event is an end of playback of the media file, and wherein the observer module is further configured to detect whether the end of playback occurred by:
  reading playback rate and duration information of the media file from a header of the media file;
  calculating an amount of data of the media file that was played by the media player;
  calculating a playback time of the media file from the playback rate and the amount of the data of the media file that was played by the media player; and
  comparing the calculated playback time with the duration information.

32. The host device of claim 21, wherein the playback event is an end of playback of the media file, and wherein the observer module is further configured to detect the end of playback occurred by detecting that all bytes of the media file were read by the media player.

33. The host device of claim 21, wherein the rule is part of a header of the media file, which header is unrecognizable to the media player, and wherein the observer module is further configured to present the media file to the media player without the header.

34. The host device of claim 33, wherein the header is unrecognizable to at least one additional application module in the host device, and wherein the observer module is further configured to present the media file to the at least one additional application module without the header.

35. The host device of claim 21, wherein the action specified in the rule is one or more of the following: connecting to a network location associated with the media file, executing an application, and displaying a message.

36. The host device of claim 21, wherein the observer module comprises a file system filter that has knowledge of file operations occurring in the host device.

37. The host device of claim 21, wherein the host device is a mobile device, and wherein the media player is a mobile media player.

38. The host device of claim 21, wherein the media file is stored in a removable mass storage device.

39. The host device of claim 38, wherein the removable mass storage device comprises a memory card.

* * * * *